(12) United States Patent
Wang

(10) Patent No.: US 7,025,091 B2
(45) Date of Patent: Apr. 11, 2006

(54) POWER STEERING CONTROL VALVE

(75) Inventor: Jinbo Wang, Morristown, TN (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 10/979,789

(22) Filed: Nov. 2, 2004

(65) Prior Publication Data

US 2005/0109408 A1 May 26, 2005

Related U.S. Application Data

(63) Continuation of application No. PCT/US03/13291, filed on May 1, 2003.

(60) Provisional application No. 60/377,572, filed on May 3, 2002.

(51) Int. Cl.
*B62D 5/085* (2006.01)

(52) U.S. Cl. .................. 137/625.23; 91/375 R

(58) Field of Classification Search .......... 137/625.21, 137/625.22, 625.23, 625.24; 91/375 A, 375 R
See application file for complete search history.

(56) References Cited

U.S. PATENT DOCUMENTS

| | | | | |
|---|---|---|---|---|
| 2,439,515 A | * | 4/1948 | Hodgson | 137/625.24 |
| 3,359,866 A | * | 12/1967 | Folkerts | 91/375 A |
| 4,335,749 A | * | 6/1982 | Walter | 137/625.22 |
| 4,445,422 A | * | 5/1984 | Bishop | 137/625.24 |
| 4,561,516 A | * | 12/1985 | Bishop et al. | 91/375 A |
| 4,848,402 A | * | 7/1989 | Elser et al. | 137/625.23 |
| 4,924,910 A | * | 5/1990 | Tabata et al. | 137/625.23 |
| 5,048,567 A | | 9/1991 | Noguchi et al. | |
| 5,259,413 A | | 11/1993 | Harpole et al. | |
| 5,263,512 A | * | 11/1993 | Emori et al. | 137/625.23 |
| 5,267,588 A | | 12/1993 | Bishop et al. | |
| 5,417,244 A | | 5/1995 | Behrens et al. | |
| 5,458,153 A | * | 10/1995 | Roeske | 137/625.24 |
| 5,562,124 A | | 10/1996 | Behrens et al. | |
| 5,582,207 A | | 12/1996 | Gilbert et al. | |
| 5,638,912 A | | 6/1997 | Haga et al. | |
| 5,730,040 A | | 3/1998 | Strong | |
| 5,755,097 A | | 5/1998 | Phillips | |
| 5,794,507 A | | 8/1998 | Strong | |
| 5,799,693 A | | 9/1998 | Strong | |
| 5,937,728 A | | 8/1999 | Strong | |
| 5,975,137 A | | 11/1999 | Strong | |
| 6,082,403 A | | 7/2000 | Strong | |
| 6,237,464 B1 | | 5/2001 | Fraley, Jr. et al. | |
| 6,240,961 B1 | | 6/2001 | Strong | |

\* cited by examiner

*Primary Examiner*—John Rivell
(74) *Attorney, Agent, or Firm*—MacMillan, Sobanski & Todd, LLC

(57) ABSTRACT

An improved structure a control valve for a power steering gear includes a valve sleeve having a plurality of lands and a valve core rotatable within the valve sleeve and having a plurality of lands. At least one land of the valve core and at least a pair of lands of the valve sleeve located on opposite sides of the land of the valve core have surfaces which cooperate with one another during rotation to produce a first constricting orifice at the beginning of rotation and a second constricting orifice at the maximum amount of rotation. The size of the second constricting orifice being greater than the size of the first constricting orifice.

16 Claims, 13 Drawing Sheets

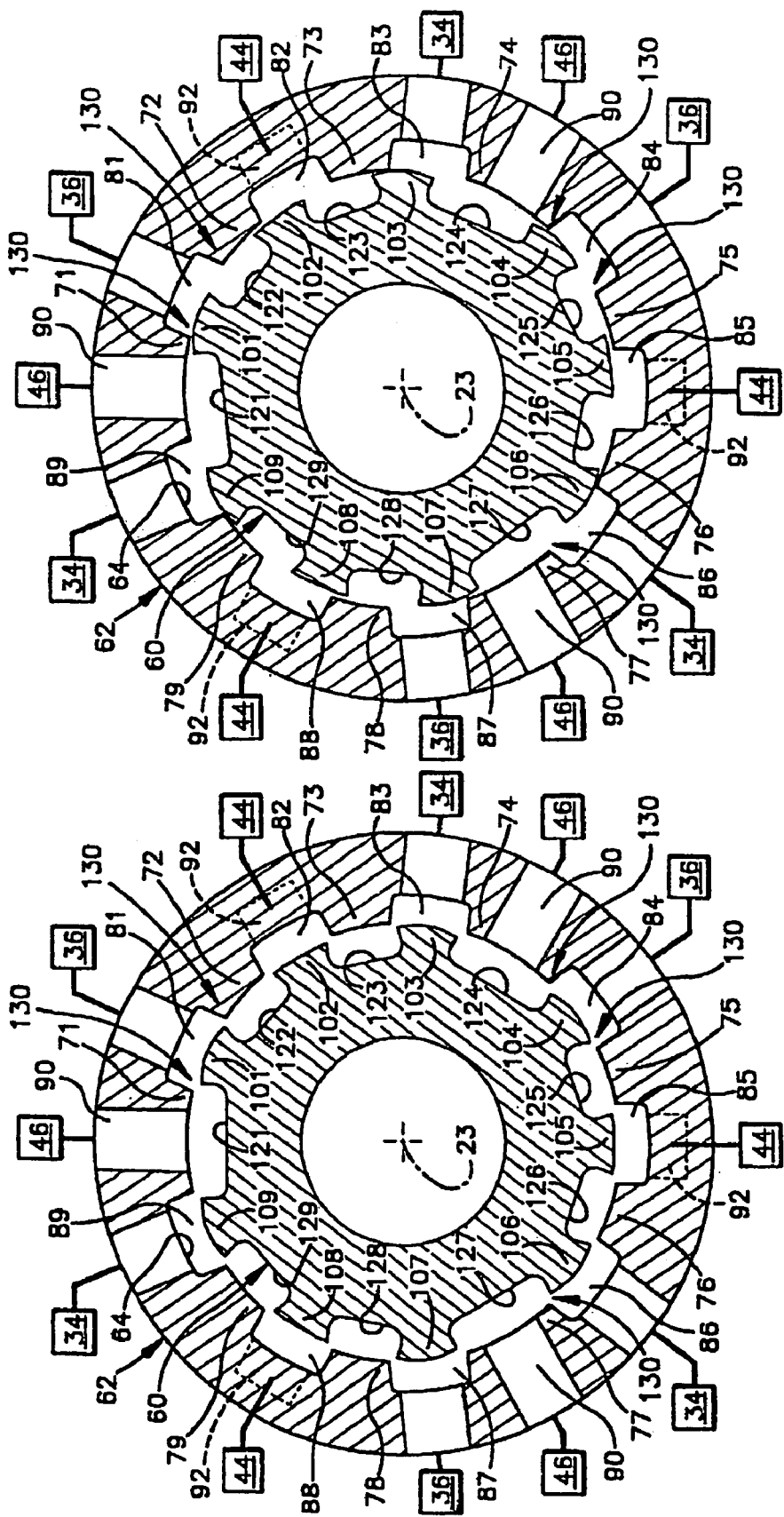

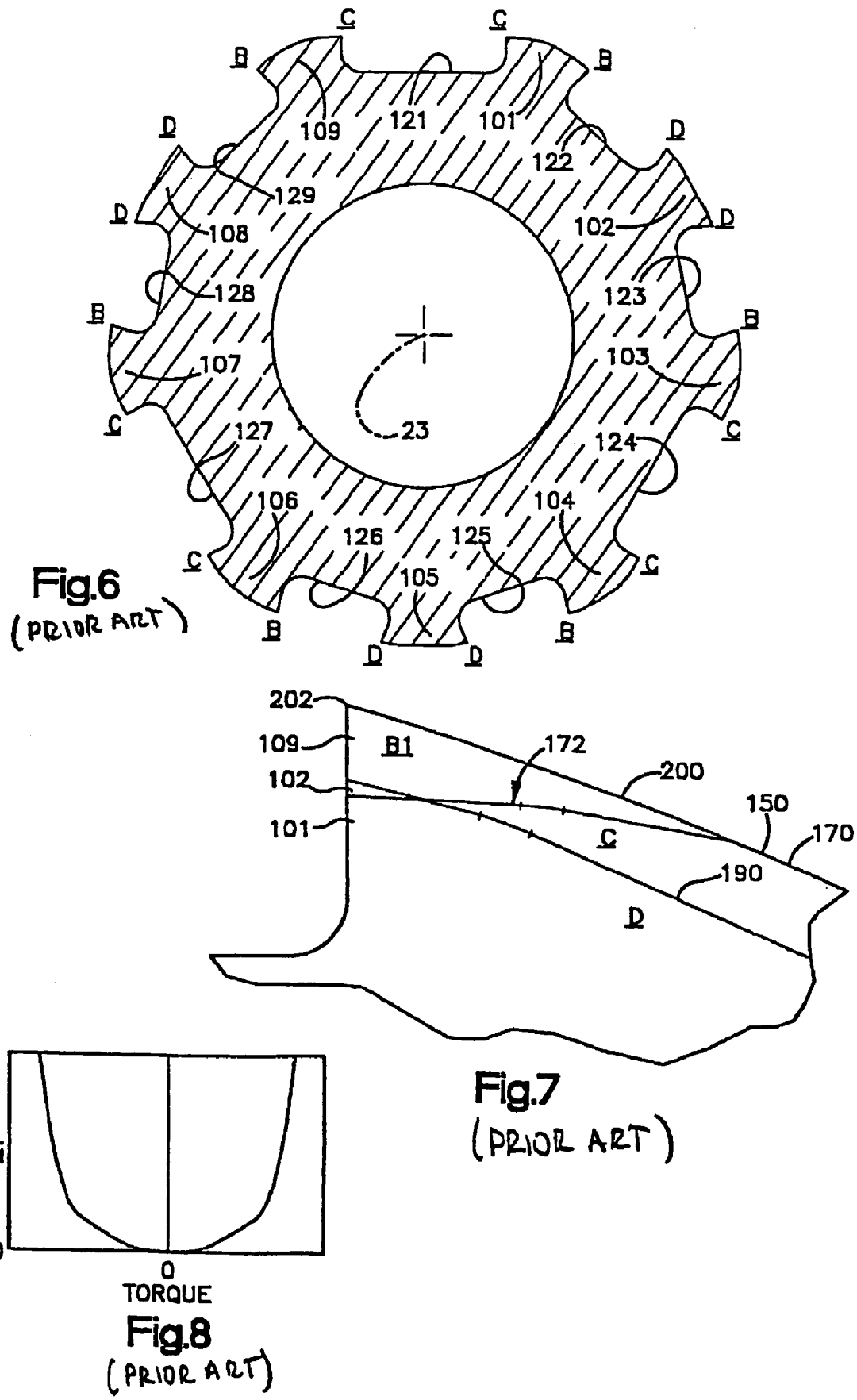

POWER STEERING CONTROL VALVE

CROSS-REFERENCE TO RELATED APPLICATIONS

This application is a continuation of PCT/US03/13291, filed May 1, 2003, which claims the benefit of U.S. Provisional Application Ser. No. 60/377,572, filed May 3, 2002.

BACKGROUND OF THE INVENTION

This invention relates in general to vehicle power steering gears and in particular to an improved hydraulic fluid control valve adapted for use in such a vehicle power steering gear.

A known hydraulic fluid control valve for a power steering gear includes a valve core rotatable within a valve sleeve. The core and the sleeve control the pressure of hydraulic fluid flowing through the valve between a pump, a reservoir, and a pair of opposed fluid chambers on opposite sides of a piston in a hydraulic motor. When the core and the sleeve are in neutral positions, the hydraulic fluid pressures in the opposed fluid chambers are equal. When the core and the sleeve are rotated from the neutral positions, a plurality of lands and grooves on the core and the sleeve cooperate to increase the hydraulic fluid pressure in one of the opposed fluid chambers so as to provide hydraulic power steering assist in the steering gear.

SUMMARY OF THE INVENTION

This invention relates to an improved structure a control valve for a power steering gear. The control valve includes a valve sleeve having a plurality of lands and a valve core rotatable within the valve sleeve and having a plurality of lands. At least one land of the valve core and at least a pair of lands of the valve sleeve located on opposite sides of the land of the valve core have surfaces which cooperate with one another during rotation to produce a first constricting orifice at the beginning of rotation and a second constricting orifice at the maximum amount of rotation. In accordance with the present invention, the size of the second constricting orifice is greater than the size of the first constricting orifice.

Other advantages of this invention will become apparent to those skilled in the art from the following detailed description of the preferred embodiments, when read in light of the accompanying drawings.

BRIEF DESCRIPTION OF THE DRAWINGS

FIG. 2 is a view of parts of the prior art apparatus of FIG. 1, with certain parts being shown in section and with other parts being shown schematically.

FIG. 3 is a view similar to FIG. 2 showing parts in different positions.

FIG. 6 is a view of a part shown fully in FIGS. 2 and 3.

FIG. 7 is a view similar to FIG. 5 showing parts of a second embodiment of a prior art apparatus.

FIG. 8 is a graph showing performance characteristics of the prior art apparatus of FIG. 7.

DETAILED DESCRIPTION OF THE PREFERRED EMBODIMENTS

Figure 1:
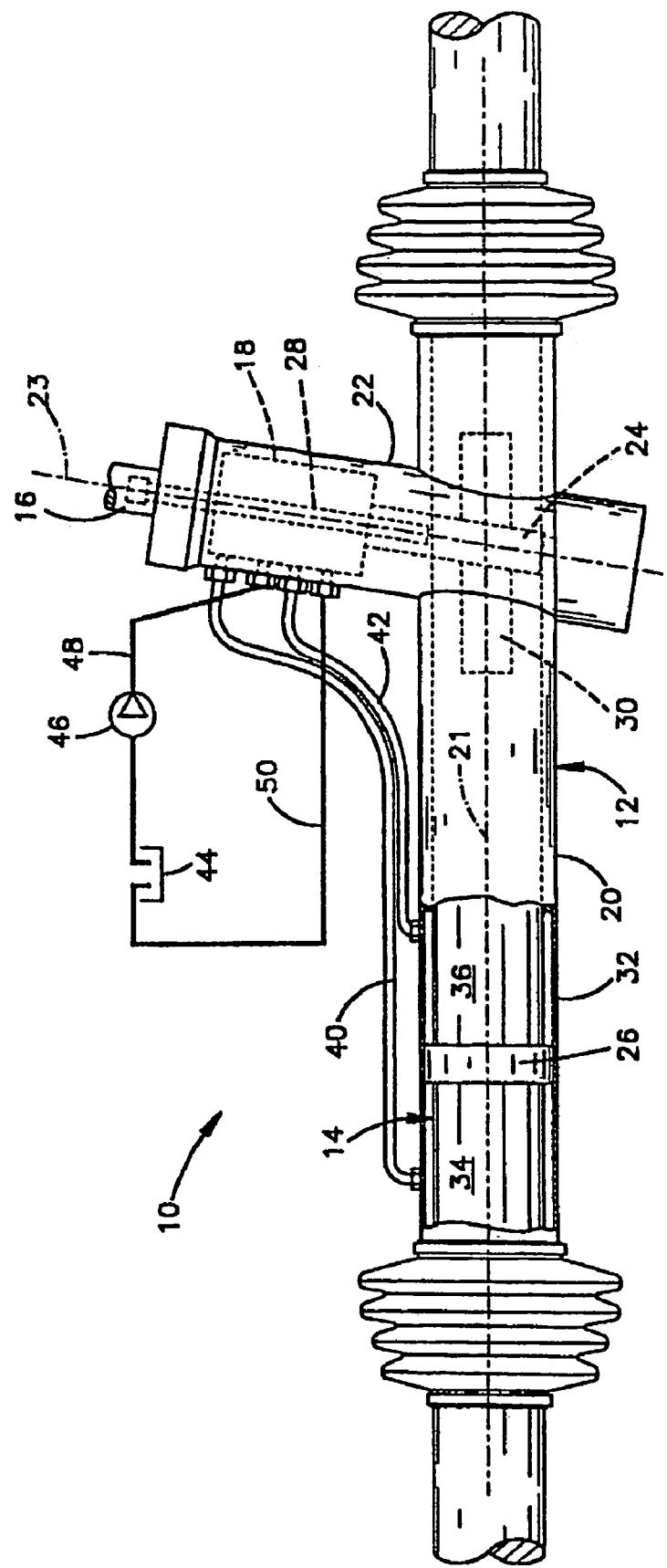
FIG. 1 is a view of a prior art apparatus.

Referring now to FIG. 1, there is illustrated a prior art hydraulic power steering gear, indicated generally at 10, which is adapted to be used in connection with the control valve of the present invention. The steering gear 10 as well as prior art FIGS. 2–10 are taken from U.S. Pat. No. 6,082,403 to Strong which is assigned to the assignee of the instant application and the disclosure of which is herein incorporated by reference. Only those portions of the steering gear 10 which are necessary for understanding the present invention will be discussed herein. Also, while the present invention will be discussed in connection with the steering gear 10 illustrated and described herein, it will be appreciated that the control valve of the present invention can be used in connection with other steering gears.

As shown in prior art FIG. 1, the steering gear 10 is a hydraulically-assisted rack and pinion steering gear including a housing 12, a steering rack 14 and an input shaft 16. The rack 14 extends longitudinally through a lower portion 20 of the housing 12 along a horizontal axis 21, and is supported for movement relative to the housing 12 along the axis 21. When the steering gear 10 is installed in a vehicle, the opposite ends (not shown) of the rack 14 are connected to steering linkages which, in turn, connect the steering gear 10 to a pair of steerable vehicle wheels.

The input shaft 16 projects outward from an upper portion 22 of the housing 12 along another axis 23, and is rotatable about the axis 23 in response to rotation of the vehicle steering wheel. The steering gear 10 operates to move the rack 14 along the axis 21 in response to rotation of the input shaft about the axis 23. The steering gear 10 thus actuates the steering linkages to steer the vehicle wheels in response to rotation of the steering wheel.

As shown schematically in prior art FIG. 1, the steering gear 10 further includes a hydraulic fluid control valve 18 which is contained in the housing 12. Other parts of the steering gear 10 include a pinion gear 24 and a piston 26. The pinion gear 24 is connected with the input shaft 16 by a torsion bar 28, and is supported for rotation about the axis 23 in meshing engagement with a row of rack teeth 30 on the rack 14. A tubular section 32 of the lower housing portion 20 functions as a power cylinder. The piston 26 is fixed to the rack 14 within the power cylinder 32. A pair of variable volume hydraulic fluid chambers 34 and 36 are located in the power cylinder 32 on opposite sides of the piston 26.

The control valve 18 communicates with the first chamber 34 in the power cylinder 32 through a first two-way conduit 40. The control valve 18 communicates with the second chamber 36 in the power cylinder 32 through a second two-way conduit 42. As further shown schematically in FIG. 1, the control valve 18 receives hydraulic fluid from a reservoir 44 and a pump 46 through an inlet conduit 48. The pump 46 could be a flow-varying pump, and could be driven by an electric motor or by the vehicle engine. An outlet conduit 50 exhausts hydraulic fluid from the control valve 18 to the reservoir 44.

The control valve 18 operates in response to rotation of the input shaft 16 with the vehicle steering wheel. When the input shaft 16 rotates with the steering wheel in a first direction about the axis 23, it rotates slightly relative to the pinion gear 24. The torsion bar 28 flexes to permit such rotation of the input shaft 16 relative to the pinion gear 24. The valve 18 responds to the resulting rotational displacement by opening hydraulic fluid flow paths that extend through the control valve 18 from the inlet conduit 48 to the first two-way flow conduit 40. The control valve 18 simultaneously closes hydraulic fluid flow paths that extend through the control valve 18 from the second two-way flow conduit 42 to the outlet conduit 50. A resulting flow of hydraulic fluid from the pump 46, and a resulting hydraulic fluid pressure differential acting across the piston 26, cause the piston 26 and the rack 14 to move to the right, as viewed in FIG. 1, along the axis 21. This causes the steering linkage to steer the vehicle wheels in a first direction.

As the rack moves along the axis 21 with the piston 26, the pinion gear 24 rotates in meshing engagement with the rack teeth 30. The pinion gear 24 then rotates about the axis 23 relative to the input shaft 16 in a follow-up manner so as to cancel the rotational displacement between the pinion gear 24 and the input shaft 16. The control valve 18 responds by closing the previously opened hydraulic fluid flow paths. This equalizes the hydraulic fluid pressures acting on the piston 26 in the two chambers 34 and 36 in the power cylinder 32, and causes the piston 26 and the rack 14 to stop moving along the axis 21.

When the vehicle wheels are to be steered in an opposite direction, the input shaft 16 is rotated with the steering wheel in an opposite direction about the axis 23, and is again rotated slightly relative to the pinion gear 24 upon flexing of the torsion bar 28. The control valve 18 responds by pressurizing the second chamber 36 and by simultaneously exhausting the first chamber 34. The piston 26 and the rack 14 then move axially to the left, as viewed in FIG. 1. A resulting follow-up rotation of the pinion gear 24 relative to the input shaft 16 causes the control valve 18 again to equalize the hydraulic fluid pressures in the two chambers 34 and 36 in the power cylinder 32.

As shown in prior art FIG. 2, the control valve 18 includes a valve core 60 and a valve sleeve 62. Both the core 60 and the sleeve 62 have generally cylindrical shapes centered on the axis 23. The core 60 is defined by a section of the input shaft 16 (FIG. 1). The sleeve 62 is connected with an upper end portion of the pinion gear 24 (FIG. 1) Accordingly, the core 60 and the sleeve 62 rotate relative to each other when the input shaft 16 and the pinion gear 24 rotate relative to each other. As described in detail below, the core 60 and the sleeve 62 then vary the hydraulic fluid flow paths extending through the control valve 18 so that certain flow paths become relatively unrestricted and certain flow paths become relatively restricted. Pressurized flows of hydraulic fluid are thereby directed through the control valve 18 between the pump 46 and the fluid chambers 34 and 36 in the power cylinder 32, as described above with reference to prior art FIG. 1.

The sleeve 62 has a radially inner periphery 64 extending circumferentially around the core 60. The inner periphery 64 of the sleeve 62 has an undulating contour defined by a plurality of circumferentially spaced lands and grooves. Specifically, the sleeve 62 has nine lands 71, 72, 73, 74, 75, 76, 77, 78 and 79 which are spaced apart circumferentially about the axis 23. The sleeve 62 further has nine grooves 81, 82, 83, 84, 85, 86, 87, 88 and 89, each of which is located circumferentially between a pair of adjacent lands.

Three inlet ports 90 extend radially inward through the sleeve 62 at the locations; of the first land 71, the fourth land 74, and the seventh land 77. As shown schematically in prior art FIG. 2, the inlet ports 90 receive hydraulic fluid from the pump 46. As further shown schematically in prior art FIG. 2, some of the grooves in the sleeve 62 communicate with the fluid chambers 34 and 36 in the power cylinder 32 (FIG. 1), and some of the grooves communicate with the reservoir 44. Specifically, the first, fourth and seventh grooves 81, 84 and 87 communicate with the chamber 36 on the right side of the piston 26. The third, sixth and ninth grooves 83, 86 and 89 communicate with the other chamber 34 on the left side of the piston 26. The second, fifth and eight grooves 82, 85 and 88 communicate with the reservoir 44 through outlet ports 92 (shown schematically) at the ends of the grooves 82, 85 and 88.

The core 60 also has an undulating contour defined by circumferentially spaced lands and grooves. These include nine lands 101–109 and nine grooves 121–129. The lands 101–109 on the core 60 are located radially opposite the grooves 81–89 in the sleeve 62. The grooves 121–129 in the core 60 are located radially opposite the lands 71–79 on the sleeve 62. Accordingly, the adjacent corners of the lands 71–79 and 101–109 define eighteen orifices 130 between the grooves 81–89 and 121–129.

When a steering maneuver is not being performed, the core 60 and the sleeve 62 are located in neutral positions, as shown in FIG. 2. Hydraulic fluid then flows from the inlet ports 90 to the outlet ports 92 through the grooves 121–129, the orifices 130, and the grooves 81–89. This flow results from a pressure drop between the pump 46 and the reservoir 44. However, there is no pressure differential between the fluid chambers 34 and 36 in the power cylinder 32 when a steering maneuver is not being performed. Accordingly, there is no pressure differential between the set of grooves 81, 84 and 87 that communicate with the right chamber 36 and the other set of grooves 83, 86 and 89 that communicate with the left chamber 34.

When the vehicle steering wheel and the input shaft 16 (FIG. 1) are turned to the left, the core 60 rotates relative to the sleeve 62 in a counterclockwise direction, as viewed in FIGS. 2 and 3. Nine of the eighteen orifices 130 are then enlarged, and the other nine orifices 130 are then constricted. This causes the hydraulic fluid pressure to increase in the set of grooves 83, 86 and 89 that communicate with the left chamber 34 in the power cylinder 32, and simultaneously causes the hydraulic fluid pressure to increase a lesser amount in the set of grooves, 31, 84 and 87 that communicate with the right chamber 36. In this manner, a small portion of the hydraulic fluid flow extending from the inlet ports 90 to the outlet ports 92 is diverted to the left chamber 34 through the grooves 83, 86 and 89. An equal flow of hydraulic fluid is simultaneously exhausted from the right chamber 36 to the corresponding grooves 81, 84 and 87. The piston 26 and the rack 14 then move to the right, as viewed in FIG. 1. This causes the steering linkages to turn the steerable vehicle wheels to the left.

Figure 4:
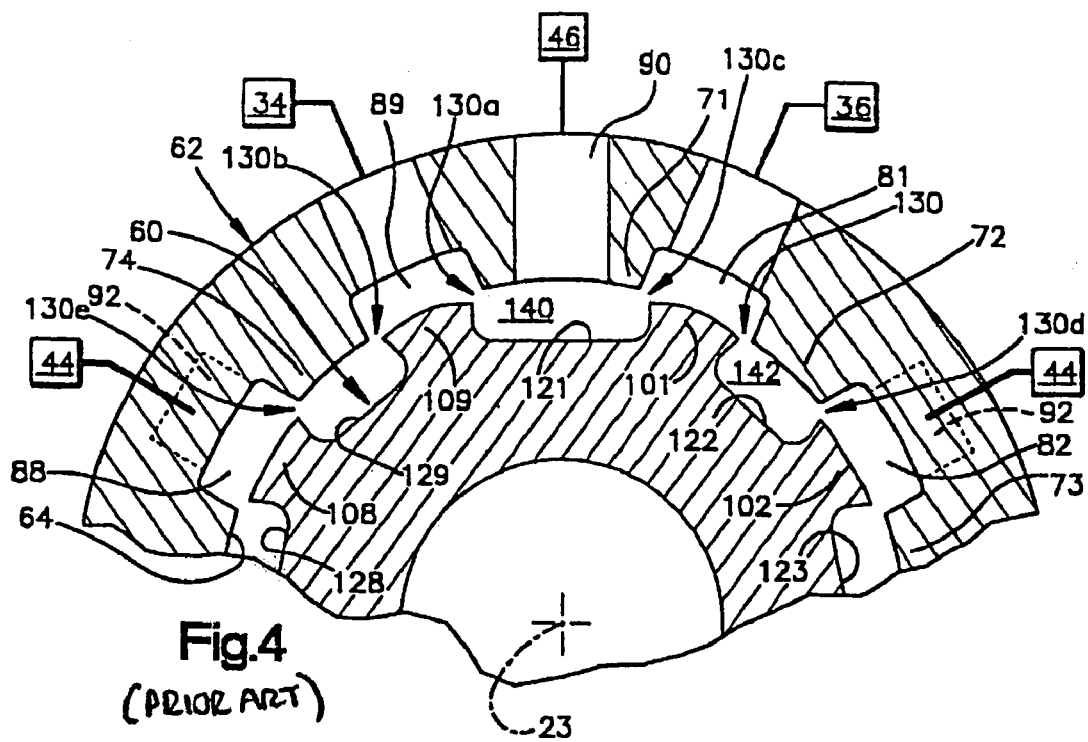
FIG. 4 is an enlarged partial view of parts shown in FIG. 2.

As shown in the enlarged view of prior art FIG. 4, one of the orifices 130 that enlarges is differentiated from three of the orifices 130 that constrict upon rotation of the core 60 from the neutral position of prior art FIG. 2 to the shifted position of prior art FIG. 3. Specifically, one of the enlarging orifices 130 is designated by the reference number 130a in FIG. 4. An adjacent pair of constricting orifices 130 are designated by the reference numbers 130b and 130c. Those constricting orifices 130b and 130c define circumferentially opposite ends of a high pressure region 140 located within the valve 18 between the pump 46 and the left fluid chamber 34. Another constricting orifice 130 is designated by the reference number 130d. The constricting orifices 130d and 130c define circumferentially opposite ends of a low-pressure region 142 which is located within the control valve 18 between the right fluid chamber 36 and the reservoir 44.

As described above, hydraulic fluid continuously flows between the core 60 and the sleeve 62 from the inlet ports 90 to the outlet ports 92. Accordingly, the constricting orifice 130d of prior art FIG. 4 is located downstream of the constricting orifice 130c. The constricting orifice 130d thus provides back pressure at the constricting orifice 130c when the core 60 is rotating from the neutral position of prior art FIG. 2 toward the shifted position of prior art FIG. 3. However, there is no back pressure applied at the constricting orifice 130b at the circumferentially opposite end of the high pressure region 140. This is because the next adjacent downstream orifice 130e is enlarging rather than constricting. A stabilizing back pressure force is applied to the piston 26 in the low pressure fluid chamber 36 by applying back pressure to the flow at the constricting orifice 130c, while not applying back pressure to the flow at the constricting orifice 130b, in this manner. This results from the chamfered shapes of the corner portions of the lands 109, 101, and 102 beside the orifices 130b, 130c and 130d, respectively.

Figure 5:
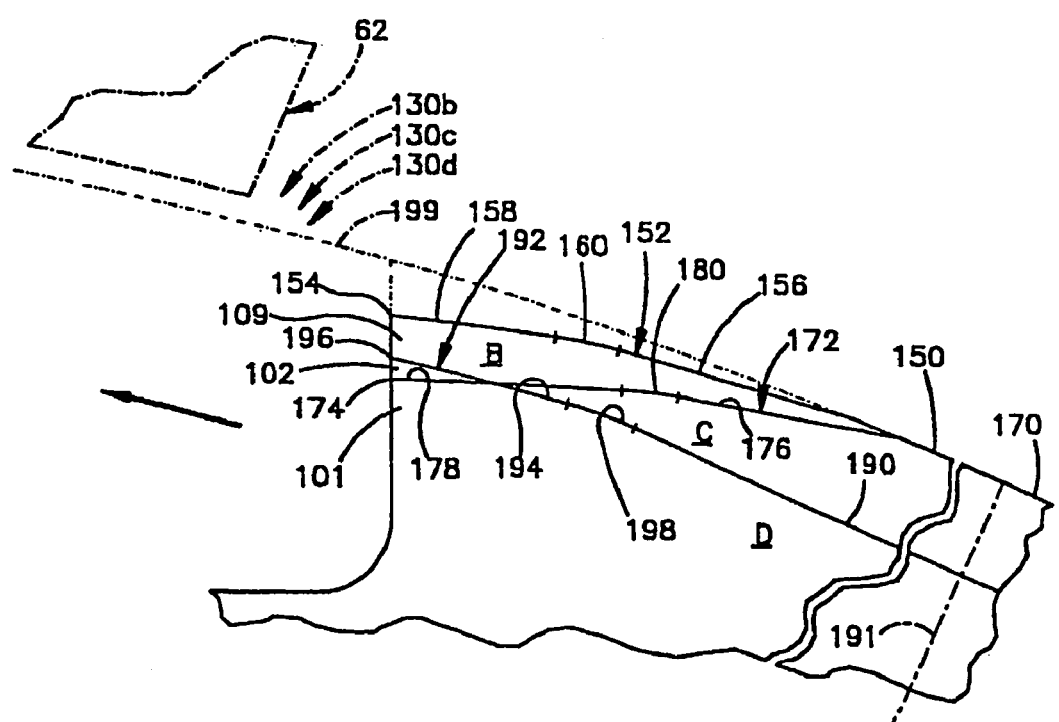
FIG. 5 is an enlarged view showing a superimposed relationship of parts shown in FIG. 4.

Prior art FIG. 5 shows the chamfered corner portions of the lands 109, 101 and 102 at the orifices 130b, 130c, and 130d, respectively, in a superimposed relationship of radial profiles for the purpose of comparison with each other. The land 109 has a cylindrical surface 150 with a circular radial profile centered on the axis 23 of rotation. The land 109 further has an edge surface 152 which is inclined radially inward from the cylindrical surface 150 to the adjacent corner 154 of the land 109. The edge surface 152 comprises a plurality of smaller surfaces having distinct radial profiles. These include a first planar facet 156, a second planar facet 158, and an arcuate intermediate surface 160. The first facet 156 extends from the cylindrical surface 150 to the intermediate surface 160. The second facet 158 is inclined radially inward relative to the first facet 156, and extends oppositely from the corner 154 to the intermediate surface 160. The intermediate surface 160 is tangent to each of the facets 156 and 158.

The land 101 has a cylindrical surface 170 concentric with the cylindrical surface 15C, of the land 109. The land 101 also has an edge surface 172 which is tapered radially inward from the cylindrical surface 170 to the adjacent corner 174 of the land 101. The edge surface 172 comprises a first planar face 176, a second planar facet 178, and an arcuate intermediate surface 180, each of which also has a distinct radial profile.

As compared with the first facet 156 at the edge surface 152, the first facet 176 at the edge surface 172 intersects the corresponding cylindrical surface 170 at a location that is spaced circumferentially farther away from the corresponding corner 174. The facet 176 is also inclined and spaced radially inward more than the facet 156. The second facet 178 at the edge surface 172 has a lesser angle of radially inward inclination, as compared with the second facet 158 at the edge surface 152. However, the second facet 178 is larger and is spaced radially inward more than the second facet 158. The intermediate surface 180 is smaller than the intermediate surface 160, but also is tangentially intersected by the corresponding facets 176 and 173.

The land 102 does not have a cylindrical surface like the cylindrical surfaces 150 and 170 at the lands 109 and 101. Instead, the land 102 has a large planar facet 190 extending fully between its chamfered opposite corner portions. The facet 190 is perpendicular to a centerline 191 of the land 102 extending diametrically through the axis 23. The edge surface 192 at the chamfered corner portion of the land 102 that is shown in prior art FIG. 5 has a single planar facet 194 extending from the corresponding corner 196 toward the facet 190. The edge surface 192 further has an arcuate end section 198 which is tangentially intersected by the facets 190 and 194. The corner 196 of the land 102 is located radially between the corners 154 and 174 of the lands 109 and 101. The facet 194 extends radially inward across the facet 178, as viewed in prior art FIG. 5, and the facet 190 is inclined and spaced radially inward from each of the other facets 156, 158, 176, 178 and 194.

When the core rotates relative to the sleeve 62 to the left, as viewed in prior art FIG. 5, the orifice s 130b, 130c and 130d become constricted in the manner described above with reference to prior art FIGS. 3 and 4. Specifically, the orifices 130b, 130c and 130d initially constrict as the corners 154, 174 and 196 of the lands 109, 101 and 102 move toward the opposed corners on the sleeve 62 in directions extending from right to left in prior art FIG. 5. Also shown in prior art FIG. 5 is a circular line 199 which is concentric with the cylindrical surfaces 150 and 170. Since the corners 154, 174 and 196 are all spaced radially inward from the circular line 199, none of the orifices 130b, 130c and 130d becomes fully constricted when the corresponding corner 154, 174 or 196 moves beside the opposed corner on the sleeve 62. Instead, each of those orifices 130b, 130c, and 130d continues to constrict as the corresponding edge surface 152, 172 or 192 moves past the opposed corner on the sleeve 62.

When the orifice 130d constricts in the foregoing manner, it applies back pressure to the flow of hydraulic fluid then passing through the orifice 130c, as described above with reference to prior art FIG. 4. The flow of hydraulic fluid then passing through the orifice 130b continues without such an application of back pressure, also as described above with reference to prior art FIG. 4.

The orifice 130b subsequently becomes fully constricted when the cylindrical surface 150 reaches and moves beside the opposed corner on the sleeve 62. The orifice 130c becomes fully and equally constricted when the concentric cylindrical surface 170 reaches and moves beside the corresponding corner on the sleeve 62. However, the orifice 130d becomes fully constricted at a substantially earlier time when the facet 190 reaches and moves beside the corresponding corner on the sleeve 62, and has a fully constricted size which is much larger than the fully constricted sizes of the orifices 130b and 130c. This ensures that the back pressure provided by constriction of the orifice 130d does not exceed a predetermined level.

As further shown in prior art FIG. 5, the chamfered corner contour of the land 109 beside the orifice 130b is designated by the letter B. The chamfered corner contour of the land 101 beside the orifice 130c is designated by the letter C. The chamfered contour of the land 102 beside the orifice 130d is similarly designated by the letter D. Prior art FIG. 6 shows the preferred locations where the B, C, and D contours are repeated about the circumference of the core 60. Although the B and C contours are preferably different from each other, as shown in FIG. 5, they could alternatively be the same as each other.

In the arrangement of prior art FIG. 6, any pair of constricting orifices at opposite ends of a high-pressure region between the core 60 and the sleeve 62 will have back pressure applied at one of the orifices in the pair, but not at the other, in accordance with the present invention. The back pressure will be applied by the next constricting orifice located downstream from the orifice receiving back pressure. In other words, whenever a pair of corners having the B and C contours define opposite ends of a high pressure region like the high pressure region 140 of FIG. 4, the constricting orifice at the corner having the C contour will be subjected to back pressure from the orifice at the next adjacent downstream corner having the D contour. The opposite effect will be provided when the core 60 is rotated in the opposite direction.

A second embodiment is shown partially in prior art FIG. 7. In the second embodiment, the land 109 of FIG. 5 has an alternative contour designated B1. Unlike the B contour of FIG. 5, the B1 contour of FIG. 7 is not chamfered. The 21 contour is instead defined by a cylindrical surface 200 of the land 109 which extends fully to the corner 202 of the land 109. Unlike the orifice 130b of FIG. 5, an orifice beside the B1 contour of FIG. 7 will become fully constricted when the corner 202 and the cylindrical surface 200 together move beside and past an opposed corner on the sleeve 62. Accordingly, such an orifice will become fully constricted at a relatively earlier time. This feature enables the prior art control valve 18 to provide a linear relationship between the torque in the input shaft 16 (FIG. 1) and the pressure differential acting across the piston 26, if such a linear relationship is desired, as shown in FIG. 8.

Figure 9:
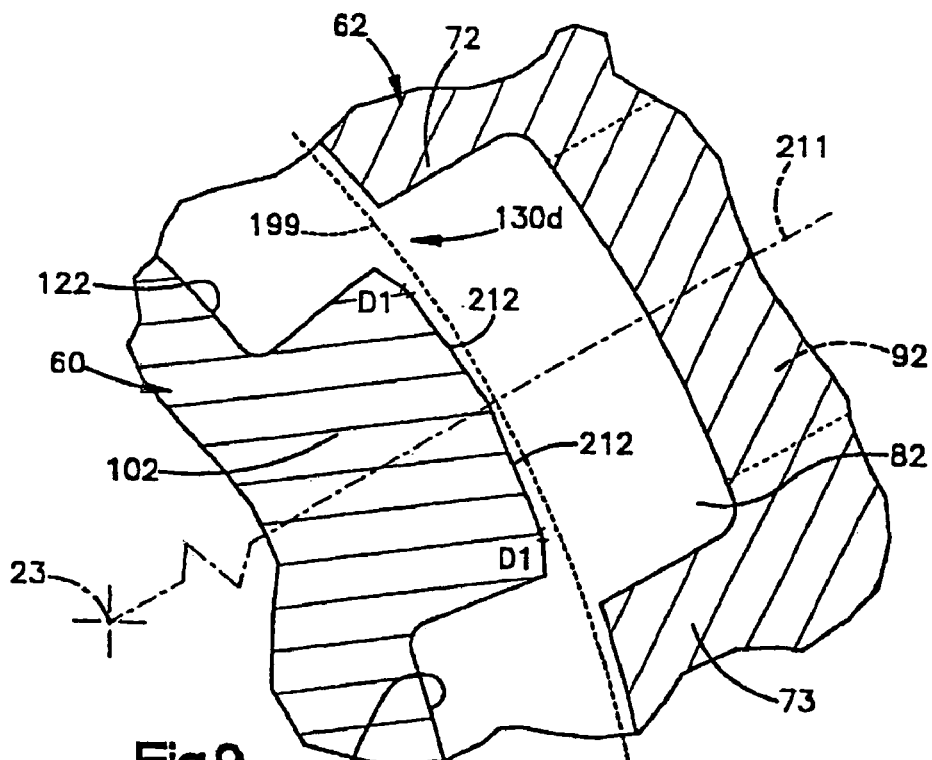
FIG. 9 is a view similar to FIG. 4 showing parts of a third embodiment of a prior art apparatus.

A third embodiment is shown partially in prior art FIG. 9. In the third embodiment, the land 102 of FIG. 4 has an alternative configuration. Specifically, the land 102 in the third embodiment has a centerline 211 intersecting the axis 23, and is symmetrical about the centerline 211, but has a pair of chamfered opposite corner portions with alternative contours D1.

The land 102 of FIG. 9 has a pair of large planar facets 212 extending from the opposite corner portions to the centerline 211. Also shown in FIG. 9 is the circular line 199 of FIG. 5. Like the planar facet 190 on the land 102 of FIG. 5, each of the planar facets 212 on the alternative land 102 of FIG. 9 is entirely spaced radially inward from the circular line 199. This ensures that each of the planar facets 212 will define fully a constricted size for its corresponding orifice that is substantially larger than the fully constricted sizes of an associated pair of parallel constricting orifices in the same manner as described above with reference to the orifices shown in FIG. 5. However, unlike the planar facet 190 of FIG. 5, the planar facets 212 of FIG. 9 are inclined relative to the corresponding centerline 211. The alternative land 102 thus has a crown-shaped radial cross-section. A lesser amount of metal material needs to be cut away from the original outer diameter of the core 60 upon formation of the crown-shaped land 102 of FIG. 9, as compared with the amount of metal material that must be cut away to form the more fully flattened land 102 of FIGS. 4 and 5.

Figure 10:
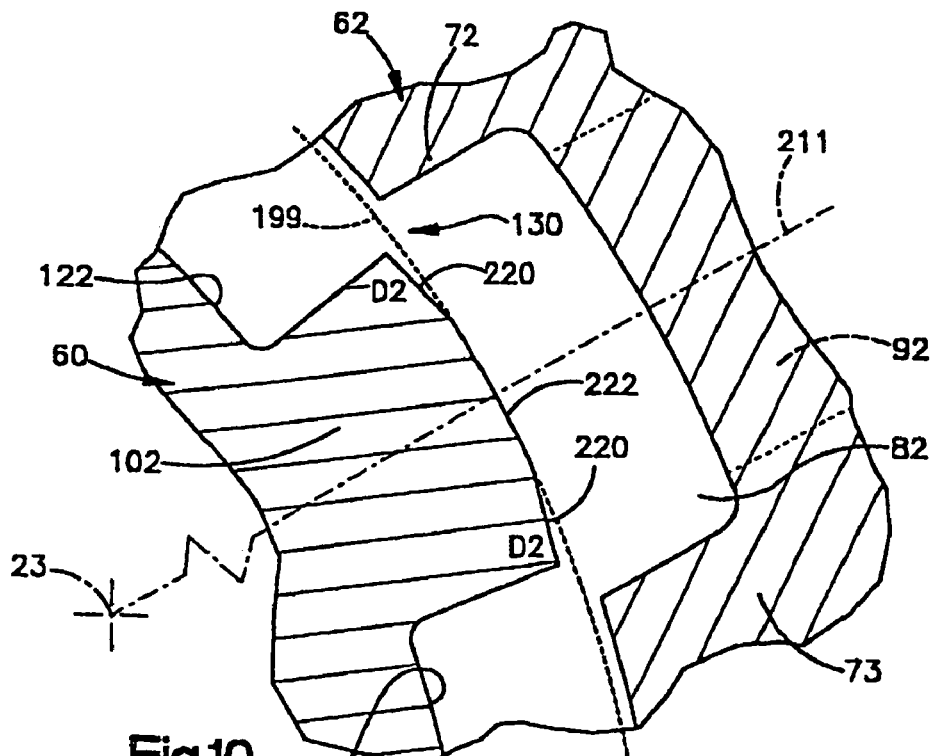
FIG. 10 is a view similar to FIG. 9 showing parts of a fourth embodiment of a prior art apparatus.
Figure 11:
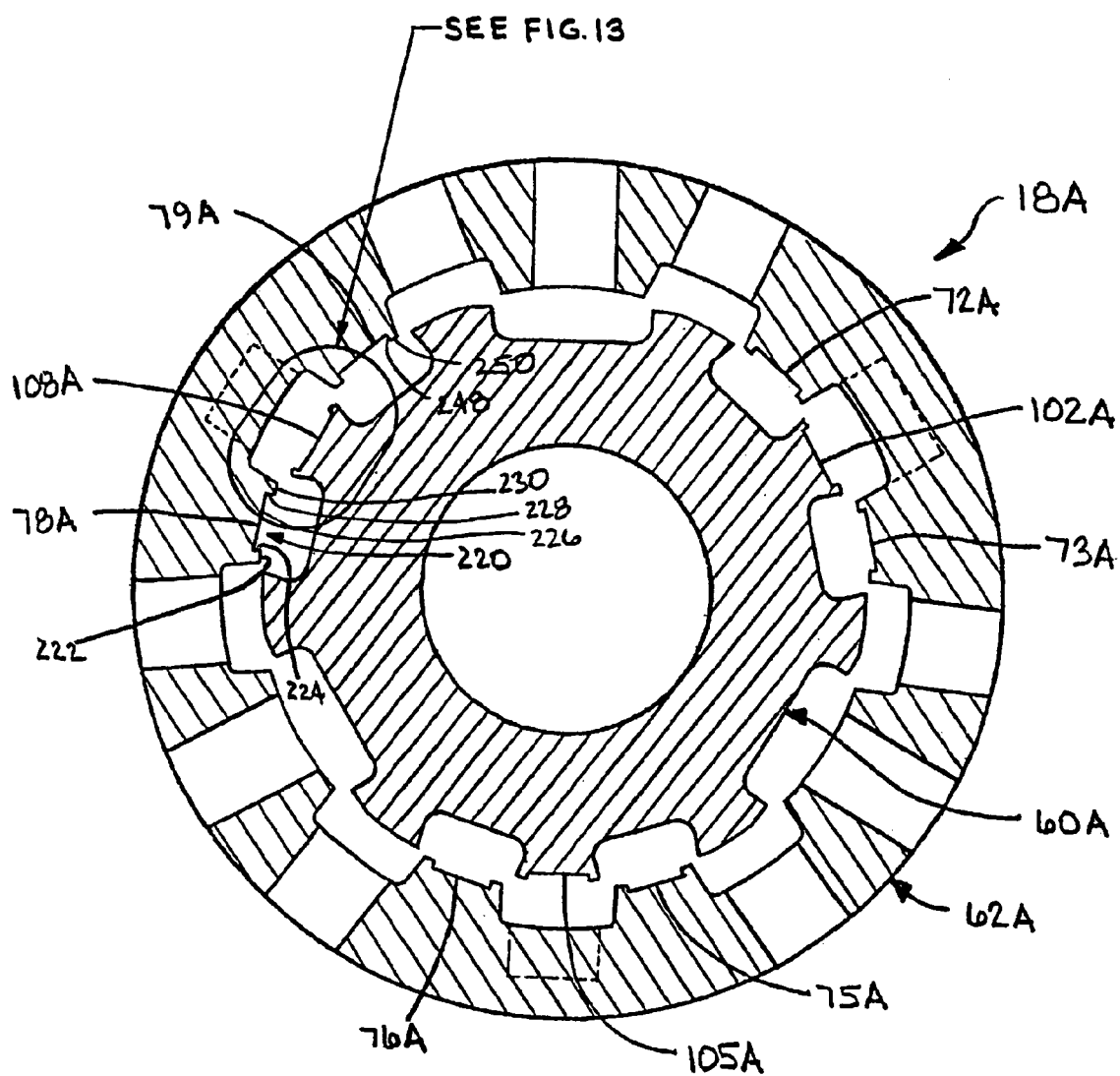
FIG. 11 is a view similar to prior art FIG. 4 showing parts of a first embodiment of an apparatus in accordance with the present invention.

A fourth embodiment is shown partially in prior art FIG. 10. In the fourth embodiment, the land 102 has an alternative crown-shaped cross-section which differs somewhat from the crown-shaped cross-section shown in FIG. 9.

The land 102 of prior art FIG. 10 also is symmetrical about the centerline 211, and has a pair of chamfered opposite corner portions with alternative contours D2. Each of the D2 contours is defined by a single planar facet 220. A cylindrical outer surface 222 of the land 102 extends fully between the planar facets 220 along the circular line 199. Each of these planar facets 220 remains spaced radially inward from the circular line 199 throughout the entire range of rotation of the core 60 about the axis 23. This ensures that the orifices defined by the planar facets 220 have fully constricted sizes that are larger than the fully constricted sizes defined by cylindrical surfaces extending along the circular line 199. However, unlike the planar facets 212 of FIG. 9, the planar facets 220 of FIG. 10 are not entirely spaced radially inward from the circular line 199. Instead, each planar facet 220 intersects the circular line 199 at a location spaced from the centerline 211.

Referring now to FIGS. 11, 12, 13 and 14A–14E and using like reference numbers to indicate corresponding parts, there is illustrated a first embodiment of a control valve, indicated generally at 18A, which can be used in the vehicle hydraulic power steering assembly 10 of FIG. 1. The control valve 18A is similar to the control valve 18 except for three lands of the core 60A and six lands of the sleeve 62A have a different shape or profile from that of the control valve 18. In particular, lands 102A, 105A and 108A of the core 60A and lands 72A, 73A, 75A, 76A, 78A and 79A of the sleeve 62A have a different profile or shape compared to that shown in connection with the control valve 18.

Figure 13:
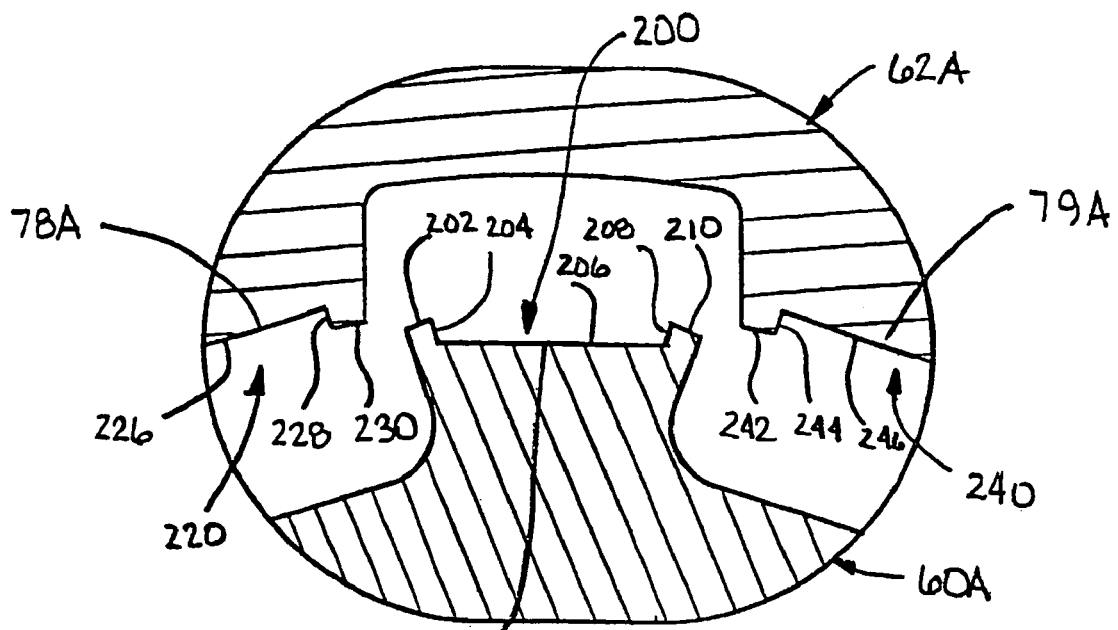
FIG. 13 is an enlarged partial view of parts shown in FIG. 11.

As best shown in FIG. 13, in this embodiment the land 108A of the core 60A has a recess, indicated generally at 200, formed therein. To accomplish this, the land 108A includes a first surface 202, a second surface 204, a third surface 206, a fourth surface 208 and a fifth surface 210. The first surface 202 and the fifth surface 210 are generally flat radially outwardly facing surfaces. The second surface 204 and the fourth surface 208 are generally flat radially inwardly facing surfaces. The third surface 206 is a generally flat surface and cooperates with the second and fourth surfaces 204 and 208 to define the recess 200. As shown in this embodiment, the recess 200 has a generally rectangular shape. Alternatively, the profile of the land 108A of the core 60A can be other than illustrated if so desired as will be discussed below. In addition, the profile of the land 108A of the core 60A can have a profile similar to that discussed above and illustrated in prior art FIGS. 2, 3, 4, 6, 9 and 10.

The land 78A of the sleeve 60A in this embodiment has a slot 220 formed therein. To accomplish this, the land 78A includes a first surface 222, a second surface 224, a third surface 226, a fourth surface 228 and a fifth surface 230. The first surface 222 and the fifth surface 230 are curved surfaces and in this embodiment are located along the common inner diameter surface of the sleeve 60A. The second surface 224 and the fourth surface 228 are generally flat radially outwardly facing surfaces. The third surface 226 is a generally flat surface and cooperates with the second and fourth surfaces 224 and 228 to define the recess 220. As shown in this embodiment, the slot 220 has a generally rectangular shape. Alternatively, the profile of the land 78A and/or the profile of the slot 220 formed in the land 78A of the sleeve 62A can be other than illustrated if so desired so long as it is effective to provide the function as discussed below.

Similarly, the land 79A of the sleeve 60A has a recess 240 formed therein. To accomplish this, the land 79A includes a first surface 242, a second surface 244, a third surface 246, a fourth surface 248 and a fifth surface 250. The first surface 242 and the fifth surface 250 are curved surfaces. The second surface 244 and the fourth surface 248 are generally flat radially outwardly facing surfaces. The third surface 246 is a generally flat surface and cooperates with the second and fourth surfaces 244 and 248 to define the recess 240. As shown in this embodiment, the recess 240 has a generally rectangular shape.

In this embodiment, the lands 102A and 105A of the core 60A and the lands 72A and 73A and 75A and 76A of the sleeve 62A have an identical profile to that of the land 108A of the core 60A and the lands 78A and 79A of the sleeve 62A; however, the profile of one or more of the lands 102A, 105A and 108A of the core 60A and/or the profile of one or more of the lands 72A, 73A, 75A, 76A, 78A and 79A of the sleeve 62A can be other than illustrated if so desired. Also, as will be discussed, while it is preferred to change the three sets of adjacent lands, 72A and 73A, 75A and 76A, and 78A and 79A only one of these sets of lands could be changed. Also, in this embodiment, three lands 102A, 105A and 108A of the core 60A have all been changed compared to the lands 102, 105 and 108 of the core 60 of the prior art control valve 18. However, as will be discussed below, in accordance with the present invention none or only one of the three lands 102, 105 and 108 of the core 60 needs to be changed. It is understand that if one or more of the lands of the core is to be changed, it shall be the land or lands which are located between the pairs of lands of the sleeve which are changed.

Figure 14A:
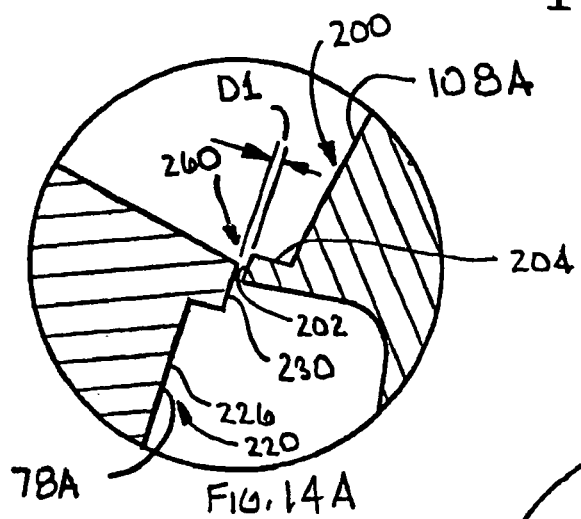
FIGS. 14A–14E are enlarged view of a portion of the apparatus illustrated in FIG. 11, showing the position of the parts during rotation of the apparatus.

Turning now to FIGS. 14A–14E, the operation of the invention according to this embodiment will be discussed. FIG. 14A is an enlarged view of a portion of the valve 18A showing the position of the land 108A of the core 60A and the land 78A of the sleeve 62A when the core 60A has rotated counterclockwise about two degrees, the parts being exaggerated for clarity purposes. As shown therein, in this position a constricting orifice 260 is created between the surface 230 of the sleeve land 78A and the surface 202 of the core land 108A. The constricting orifice 240 defines a distance D1.

Figure 14B:
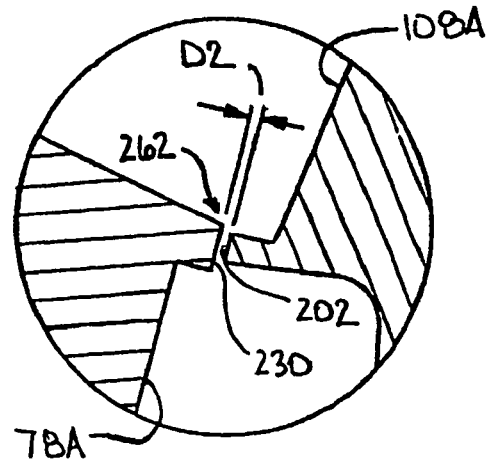

FIG. 14B is an enlarged view showing the position of the land 108A of the core 60A and the land 78A of the sleeve 62A when the core 60A has rotated counterclockwise about three degrees. As shown therein, in this position a constricting orifice 262 is created between the surface 230 of the sleeve land 78A and the surface 202 of the core land 108A. The constricting orifice 262 defines a distance D2.

Figure 14C:
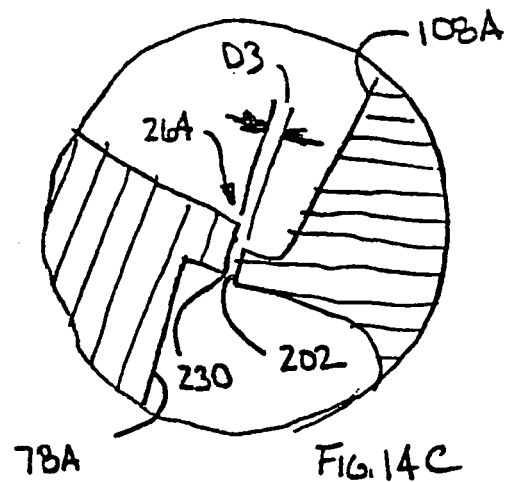

FIG. 14C is an enlarged view showing the position of the land 108A of the core 60A and the land 78A of the sleeve 62A when the core 60A has rotated counterclockwise about four degrees. As shown therein, in this position a constricting orifice 264 is created between the surface 230 of the sleeve land 78A and the surface 202 of the core land 108A. The constricting orifice 264 defines a distance D3.

Figure 12:
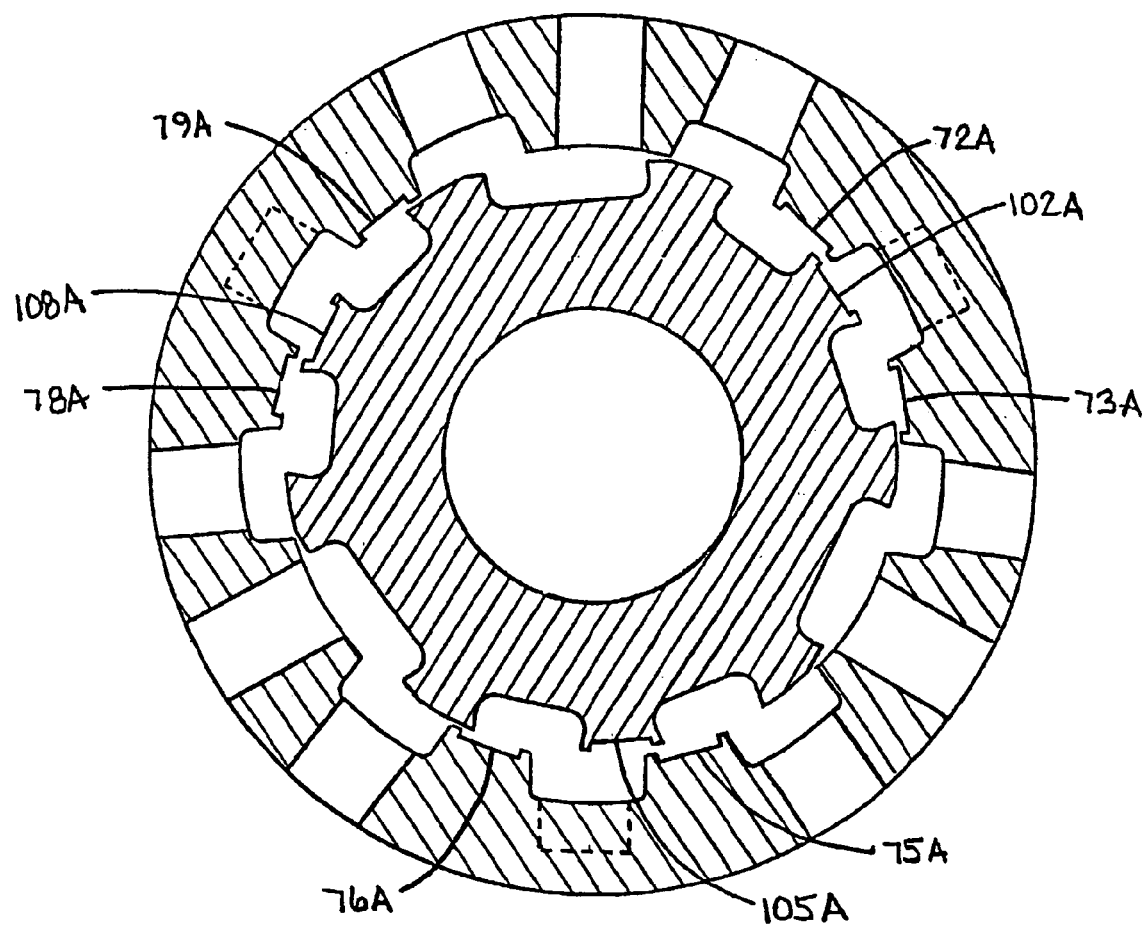
FIG. 12 is a view similar to FIG. 11 showing parts in different positions.
Figure 14D:
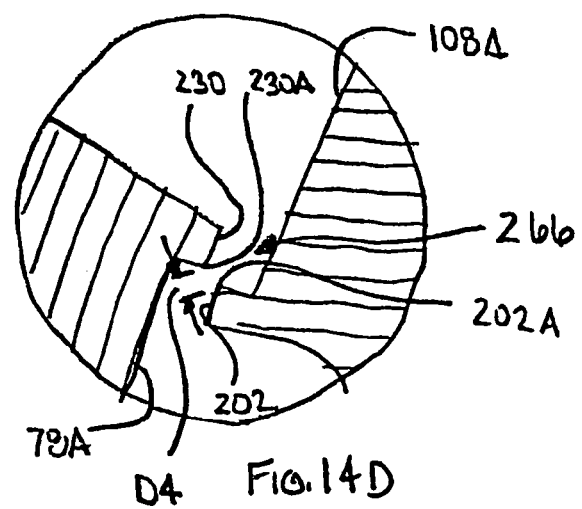

FIG. 14D is an enlarged view showing the position of the land 108A of the core 60A and the land 78A of the sleeve 62A when the core 60A has rotated counterclockwise about six degrees (FIG. 12 also shows about the same position of the entire valve 18A at about six degrees of rotation). As shown therein, in this position a constricting orifice 266 is created between an inside corner 230A of the surface 230 of the sleeve land 78A and an inside corner 202A of the surface 202 of the core land 108A. The constricting orifice 266 defines a distance D4.

Figure 14E:
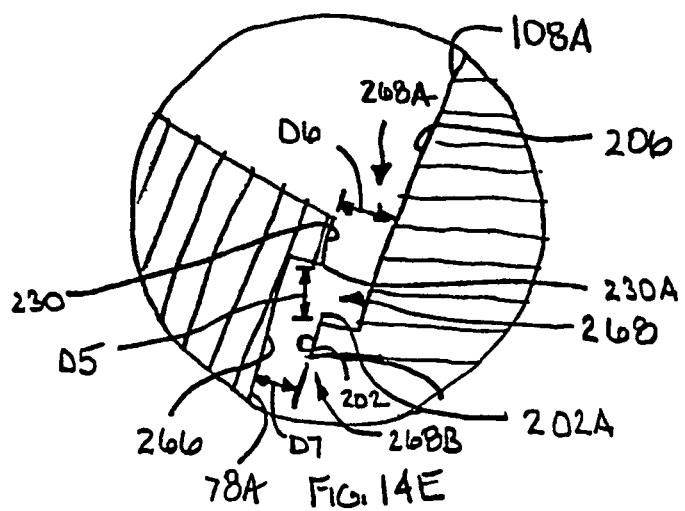

FIG. 14E is an enlarged view showing the position of the land 108A of the core 60A and the land 78A of the sleeve 62A when the core 60A has rotated counterclockwise about eight degrees. As shown therein, in this position a constricting orifice 268 is created between the inside corner 230A of the surface 230 of the sleeve land 78A and the inside corner 202A of the surface 202 of the core land 108A. The constricting orifice 268 defines a distance D5. Alternatively, depending upon the particular structure of the slot 220 of the sleeve 62A and the recess 200 of the core 60A, the constricting orifice 268 defined at eight degrees of rotation can be defined by other surfaces. For example, as shown in FIG. 14E, a second constricting 268A can be defined between the surface 230 and the surface 206 and a third constricting orifice 268B can be defined between the surface 226 and the surface 202. The second constricting orifice 268A defines a distance D6 and the third constricting orifice 268B defines a distance D7. In this embodiment, the distances D5, D6 and D7 are approximately equal to each other.

In accordance with this embodiment of the present invention, the distances D1, D2 and D3 are approximately equal to each other. The distance D4 is greater than the distances D1, D2 and D3. And the distance D5 is greater than the distance D4. Alternatively, the distances D1–D5 can be other than illustrated if so desired. For example, distances D1, D2 and D3 do not have to be the same and/or distance D5 can be greater than D4. Thus, it can be seen that as the core 60A and the sleeve 62A rotate relative to each other, initially a constricting orifice 260 is defined between the core land 108A and the sleeve land 78A. After a certain amount of rotation, in this embodiment somewhere after four degrees and before six degrees, the constricting orifice begins to increase (as shown by orifice 266), and continues to increase until the maximum rotation of about eight degrees occurs. The same effect will be provided when the core 60A is rotated in the opposite (clockwise) direction. Alternatively, the structure/profile lands 78A and 79A of the sleeve 62A and/or the land 108A of the core 60A can be other than illustrated if so desired so long as the constricting orifice(s) begins to increase as discussed above. To accomplish this, only the structure of the lands 78A and 79A of the sleeve 62A need to be modified, such as discussed above. Such a modified sleeve 62A could be used with any of the prior art core 60 structures shown and discussed above in connection with prior art FIGS. 2, 3, 4, 6, 9 and 10 to provide the desired function of the present invention. Also, in this embodiment, the maximum amount of rotation is eight degrees; however, the maximum amount of rotation can be less than or greater than eight degrees if so desired. For example, the maximum amount of rotation could be six degrees.

Figure 15:
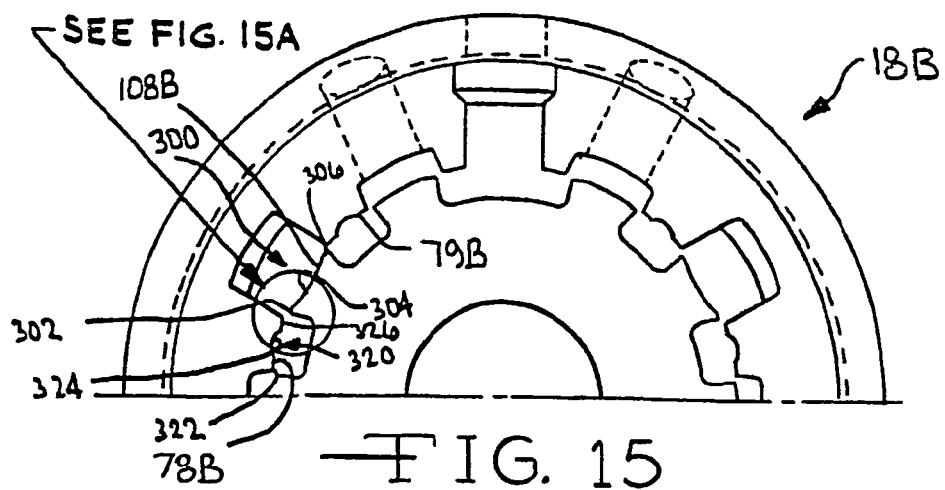
FIG. 15 is a view similar to FIG. 11, showing a portion of parts of a second embodiment of an apparatus in accordance with the present invention.

Referring now to FIG. 15 and using like reference numbers to indicate corresponding parts, there is illustrated a portion of a second embodiment of a control valve, indicated generally at 18B, which can be used in the vehicle hydraulic power steering assembly 10 of FIG. 1. The control valve 18B is similar to the control valve 18A except for the shape of three lands of the core 60B and six lands of the sleeve 62B have a different shape or profile from that of the control valve 18A. In particular, lands 102B, 105B (not shown) and 108B of the core 60B and lands 72B, 73B, 75B (not shown), 76B (not shown), 78B and 79B of the sleeve 62B have a different profile or shape compared to that shown in connection with the control valve 18A.

As best shown in FIG. 15, in this embodiment the land 108B of the core 60B has a recess, indicated generally at 300, formed therein. To accomplish this, the land 108B includes a first surface 302, a second surface 304 and a third surface 306. The first surface 302 and the third surface 306 are generally flat surfaces. The second surface 204 is an inwardly curved surface and defines the recess 300. As shown in this embodiment, the recess 300 has a generally concave shape.

The land 78B of the sleeve 60B in this embodiment has a slot 320 formed therein. To accomplish this, the land 78B includes a first surface 322, a second surface 324 and a third surface 326. The first surface 322 and the third surface 326 are curved surfaces. The second surface 324 is a generally outwardly curved surfaces. The second surfaces 326 defines the slot 320. As shown in this embodiment, the slot 320 has a generally concave shape.

Figure 15A:
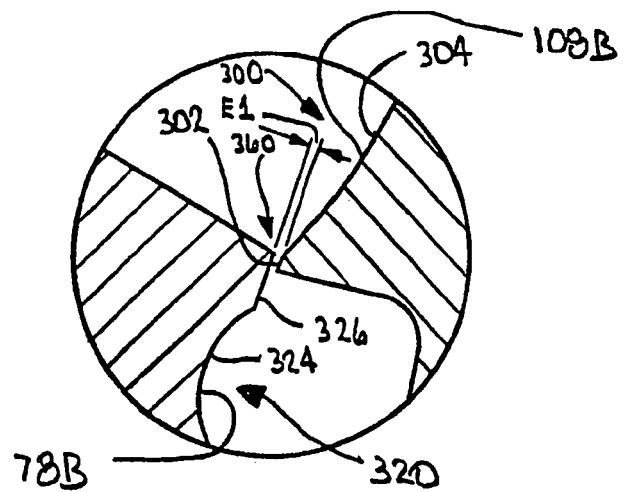
FIGS. 15A–15E are enlarged view of portions of the apparatus illustrated in FIG. 15, showing the position of the parts during rotation of the apparatus.

Turning now to FIGS. 15A–15E, the operation of the invention according to this embodiment will be discussed. FIG. 15A is an enlarged view of a portion of the valve 18B showing the position of the land 108B of the core 60B and the land 78B of the sleeve 62B when the core 60B has rotated counterclockwise about two degrees, the parts being exaggerated for clarity purposes. As shown therein, in this position a constricting orifice 360 is created between the surface 326 of the sleeve land 78B and the surface 302 of the core land 108B. The constricting orifice 360 defines a distance E1.

Figure 15B:
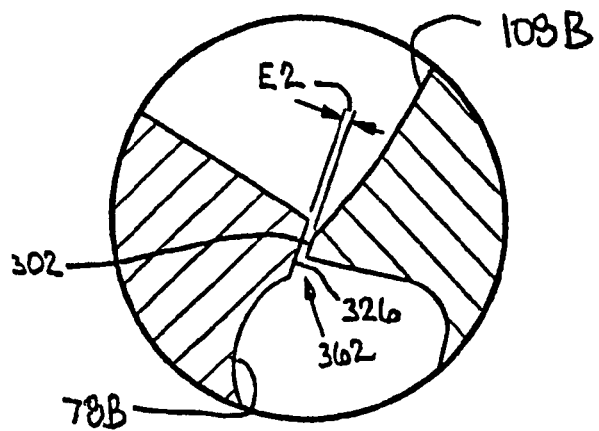

FIG. 15B is an enlarged view showing the position of the land 108B of the core 60B and the land 78B of the sleeve 62B when the core 60B has rotated counterclockwise about three degrees. As shown therein, in this position a constricting orifice 362 is created between the surface 326 of the sleeve land 78B and the surface 302 of the core land 108B. The constricting orifice 362 defines a distance E2.

Figure 15C:
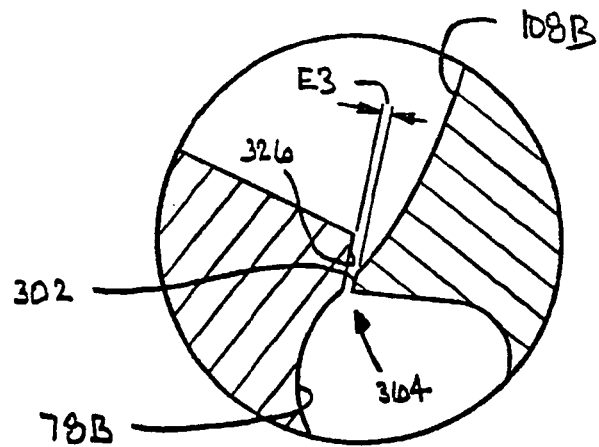

FIG. 15C is an enlarged view showing the position of the land 108B of the core 60B and the land 78B of the sleeve 62B when the core 60B has rotated counterclockwise about four degrees. As shown therein, in this position a constricting orifice 364 is created between the surface 302 of the sleeve land 78B and the surface 302 of the core land 108B. The constricting orifice 364 defines a distance E3.

Figure 15D:
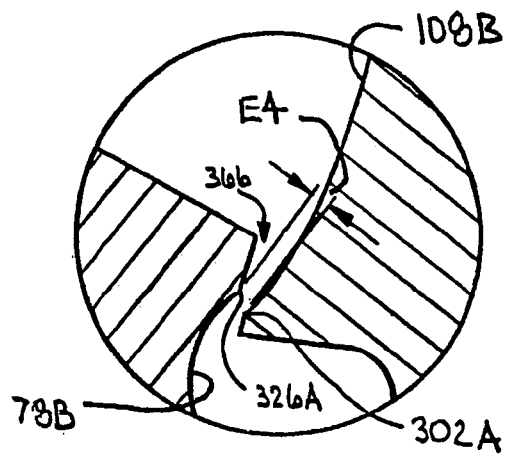

FIG. 15D is an enlarged view showing the position of the land 108B of the core 60B and the land 78B of the sleeve 62B when the core 60B has rotated counterclockwise about six degrees. As shown therein, in this position a constricting orifice 366 is created between an inside corner 326A of the surface 326 of the sleeve land 78B and an inside corner 302A of the surface 302 of the core land 108B. The constricting orifice 366 defines a distance E4.

Figure 15E:
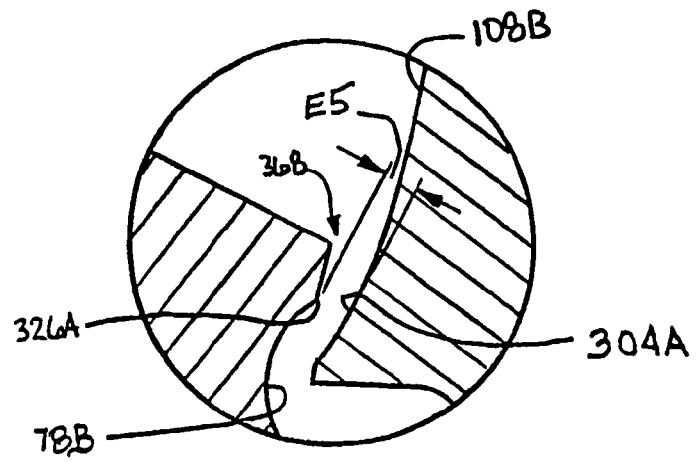

FIG. 15E is an enlarged view showing the position of the land 108B of the core 60B and the land 78B of the sleeve 62B when the core 60B has rotated counterclockwise about eight degrees. As shown therein, in this position a constricting orifice 368 is created between the inside corner 326A of the surface 326 of the sleeve land 78B and a point 304A located along the surface 304 of the core land 108B. The constricting orifice 368 defines a distance E5. Alternatively, depending upon the particular structure of the slot 320 of the sleeve 62B and the recess 300 of the core 60B, the constricting orifice 368 defined at eight degrees of rotation can be defined by other surfaces.

In accordance with this embodiment of the present invention, the distances E1, E2 and E3 are approximately equal to each other. The distance E4 is greater than the distances E1, E2 and E3. And the distance E5 is greater than the distance E4. Thus, it can be seen that as the core 60B and the sleeve 62B rotate relative to each other, initially a constricting orifice 360 is defined between the core land 108B and the sleeve land 78B. After a certain amount of rotation, in this embodiment somewhere after four degrees and before six degrees, the constricting orifice begins to increase (as shown by orifice 366), and continues to increase until the maximum rotation of about eight degrees occurs. The same effect will be provided when the core 60B is rotated in the opposite (clockwise) direction.

Figure 16:
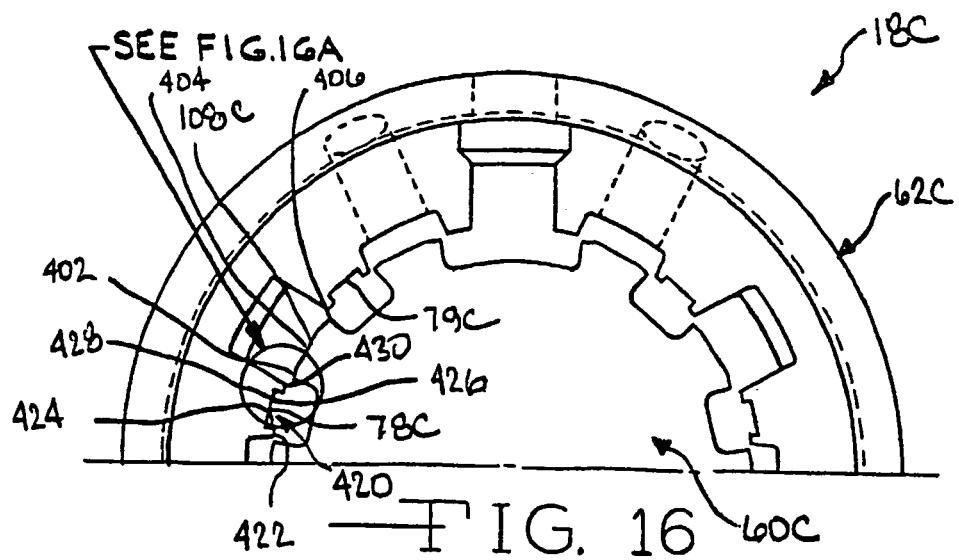
FIG. 16 is a view similar to FIG. 11, showing a portion of parts of a third embodiment of an apparatus in accordance with the present invention.

Referring now to FIG. 16 and using like reference numbers to indicate corresponding parts, there is illustrated a portion of a third embodiment of a control valve, indicated generally at 18C, which can be used in the vehicle hydraulic power steering assembly 10 of FIG. 1. The control valve 18C is similar to the control valve 18A and 18B except for the shape of three lands of the core 60C and six lands of the sleeve 62C have a different shape or profile from that of the control valves 18A and 18B. In particular, lands 102C, 105C (not shown) and 108C of the core 60C and lands 72C, 73C, 75C (not shown), 76B (not shown), 78C and 79C of the sleeve 62C have a different profile or shape compared to that shown in connection with the control valves 18A and 18B.

As best shown in FIG. 16, in this embodiment the land 108C of the core 60C includes a first surface 402, a second surface 404 and a third surface 406. The first surface 402, the second surface 404 and the third surface 406 are generally flat surfaces.

The land 78C of the sleeve 60B in this embodiment has a slot 420 formed therein. To accomplish this, the land 78C includes a first surface 422, a second surface 424, a third surface 426, a fourth surface 428 and a fifth surface 430. The first surface 422 and the fifth surface 430 are curved surfaces. The second surface 424 and the fourth surface 428 are generally flat radially outwardly facing surfaces. The third surface 426 is a generally flat surface and cooperates with the second and fourth surfaces 424 and 428 to define the recess 420. As shown in this embodiment, the slot 420 has a generally rectangular shape.

Figure 16A:
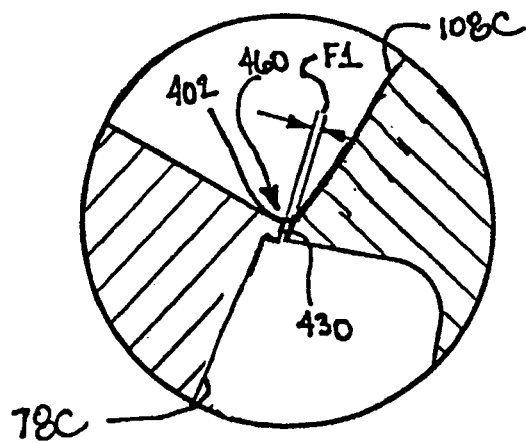
FIGS. 16A–16E are enlarged view of portions of the apparatus illustrated in FIG. 16, showing the position of the parts during rotation of the apparatus.

Turning now to FIGS. 16A–16E, the operation of the invention according to this embodiment will be discussed. FIG. 16A is an enlarged view of a portion of the valve 18C showing the position of the land 108C of the core 60C and the land 78C of the sleeve 62C when the core 60C has rotated counterclockwise about two degrees, the parts being exaggerated for clarity purposes. As shown therein, in this position a constricting orifice 460 is created between the surface 430 of the sleeve land 78C and the surface 402 of the core land 108C. The constricting orifice 460 defines a distance F1.

Figure 16B:
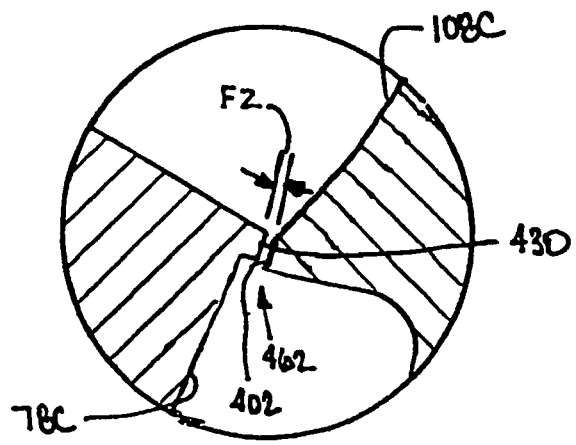

FIG. 16B is an enlarged view showing the position of the land 108C of the core 60C and the land 78C of the sleeve 62C when the core 60C has rotated counterclockwise about three degrees. As shown therein, in this position a constricting orifice 462 is created between the surface 430 of the sleeve land 78C and the surface 402 of the core land 108C. The constricting orifice 462 defines a distance F2.

Figure 16C:
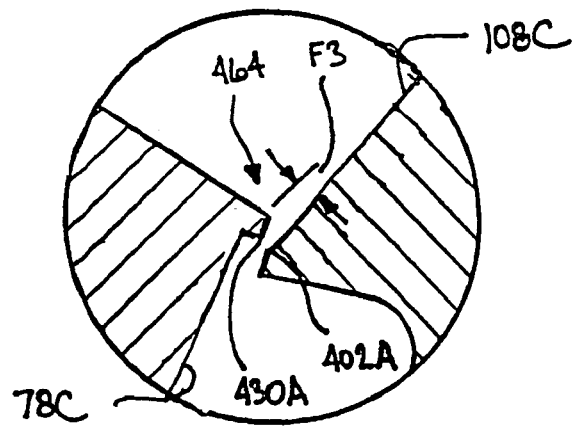

FIG. 16C is an enlarged view showing the position of the land 108C of the core 60C and the land 78C of the sleeve 62C when the core 60C has rotated counterclockwise about four degrees. As shown therein, in this position a constricting orifice 464 is created between an inside corner 430A of the surface 430 of the sleeve land 78C and an inside corner 402A of the surface 402 of the core land 108C. The constricting orifice 464 defines a distance F3.

Figure 16D:
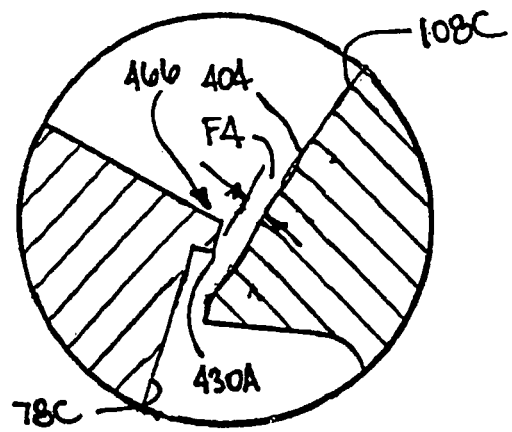
Figure 16E:
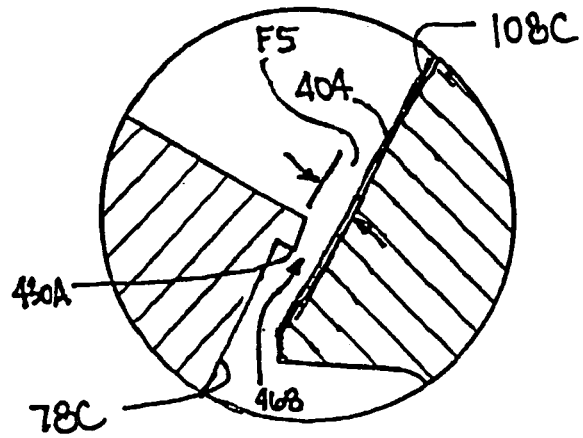

FIG. 16D is an enlarged view showing the position of the land 108C of the core 60C and the land 78C of the sleeve 62C when the core 60C has rotated counterclockwise about six degrees. As shown therein, in this position a constricting orifice 466 is created between the inside corner 430A of the surface 430 of the sleeve land 78C and the surface 404 of the core land 108C. The constricting orifice 466 defines a distance F4.

FIG. 15E is an enlarged view showing the position of the land 108C of the core 60C and the land 78C of the sleeve 62C when the core 60C has rotated counterclockwise about eight degrees. As shown therein, in this position a constricting orifice 468 is created between the inside corner 430A of the surface 430 of the sleeve land 78C and the surface 404 of the core land 108C. The constricting orifice 468 defines a distance F5.

In accordance with this embodiment of the present invention, the distances F1, F2 and F3 are approximately equal to each other. The distance F4 is greater than the distances F1, F2 and F3. And the distance F5 is approximately equal to the distance F4. Thus, it can be seen that as the core 60C and the sleeve 62C rotate relative to each other, initially a constricting orifice 460 is defined between the core land 108C and the sleeve land 78C. After a certain amount of rotation, in this embodiment somewhere after four degrees and before six degrees, the constricting orifice begins to increase (as shown by orifice 466), and continues to increase until the maximum rotation of about eight degrees occurs. The same effect will be provided when the core 60C is rotated in the opposite (clockwise) direction.

One advantage of the control valve of the present invention is that the constricting orifice(s) at the associated lands of the valve will begin to increase after a certain amount of rotation has occurred. As a result, at maximum valve rotation (approximately eight degrees), and particularly when steering fluid is cold, such as in the first few minutes after starting the vehicle in cold weather, the hydraulic assistance provided by the control valve of the present invention is increased compared to the hydraulic assistance provided by the prior art control valve. In the prior art control valve, the same constricting orifice(s) of the control valve cannot function in this manner as rotation occurs because the associated surfaces of the lands of the sleeve do not include a slot formed therein as in the lands of the sleeve of the control valve of the present invention. Thus, the control valve of the present provides improved hydraulic assistance during such "cold start" situations.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A control valve for a power steering gear comprising:
a valve sleeve having a plurality of lands; and
a valve core rotatable within said valve sleeve, said valve core having a plurality of lands;
wherein at least one land of said valve core and at least a pair of lands of said valve sleeve located on opposite sides of said land of said valve core have surfaces which cooperate with one another during rotation to produce a first constricting orifice at the beginning of rotation and a second constricting orifice at the maximum amount of rotation, the size of the second constricting orifice being greater than the size of the first constricting orifice.

2. The control valve according to claim 1 wherein the land surfaces of the sleeve have a slot formed therein.

3. The control valve according to claim 2 wherein the land surface of the core has a slot formed therein.

4. The control valve according to claim 1 wherein the size of the second constricting orifice remains generally constant after the first four degrees of rotation.

5. The control valve according to claim 1 wherein the size of the second constricting orifice gradually increases from about four degrees to about eight degrees.

6. The control valve according to claim 1 wherein the maximum rotation is in the range from about six degrees to about eight degrees and the size of the first restricting orifice remains generally constant for about the first two to about the first five degrees of rotation and then increases.

7. The control valve according to claim 1 wherein the maximum rotation is about eight degrees and the size of the first restricting orifice remains generally constant for about the first three degrees of rotation and then increases.

8. The control valve according to claim 1 wherein the maximum rotation is about eight degrees and the size of the first restricting orifice remains generally constant for about the first four degrees of rotation and then increases.

9. A control valve for a power steering gear comprising:
a valve sleeve having a plurality of lands; and
a valve core rotatable within said valve sleeve, said valve core having a plurality of lands;
wherein three lands of said valve core and three pairs of lands of said valve sleeve located on opposite sides of said three lands of said valve core have surfaces which cooperate with one another during rotation to produce a first constricting orifice at the beginning of rotation and a second constricting orifice at the maximum amount of rotation, the size of the second constricting orifice being greater than the size of the first constricting orifice.

10. The control valve according to claim 9 wherein the land surfaces of the sleeve have a slot formed therein.

11. The control valve according to claim 10 wherein the land surface of the core has a slot formed therein.

12. The control valve according to claim 9 wherein the size of the second constricting orifice remains generally constant after the first four degrees of rotation.

13. The control valve according to claim 9 wherein the size of the second constricting orifice gradually increases from about four degrees to about eight degrees.

14. The control valve according to claim 9 wherein the maximum rotation is in the range from about six degrees to about eight degrees and the size of the first restricting orifice remains generally constant for about the first two to about the first five degrees of rotation and then increases.

15. The control valve according to claim 9 wherein the maximum rotation is about eight degrees and the size of the first restricting orifice remains generally constant for about the first three degrees of rotation and then increases.

16. The control valve according to claim 9 wherein the maximum rotation is about eight degrees and the size of the first restricting orifice remains generally constant for about the first four degrees of rotation and then increases.

* * * * *